US008506354B2

(12) United States Patent  (10) Patent No.: US 8,506,354 B2
Matsumoto  (45) Date of Patent: Aug. 13, 2013

(54) CUP ATTACHING APPARATUS (75) Inventor: Toshiro Matsumoto, Gamagori (JP)

(73) Assignee: Nidek Co., Ltd., Gamagori-Shi (JP)

( * ) Notice: Subject to any disclaimer, the term of this patent is extended or adjusted under 35 U.S.C. 154(b) by 977 days.

(21) Appl. No.: 12/071,564

(22) Filed: Feb. 22, 2008

(65) Prior Publication Data
US 2008/0239700 A1 Oct. 2, 2008

(30) Foreign Application Priority Data

Mar. 30, 2007 (JP) ................................. 2007-091964

(51) Int. Cl.
*B24B 13/005* (2006.01)
(52) U.S. Cl.
USPC ...................... 451/6; 451/5; 451/43
(58) Field of Classification Search
USPC ...................... 451/5, 6, 43, 384, 390
See application file for complete search history.

(56) References Cited

U.S. PATENT DOCUMENTS 7,150,672 B2 * 12/2006 Mizuno .............................. 451/5

FOREIGN PATENT DOCUMENTS

| CN | 2521629 Y | 11/2002 |
|----|-----------|---------|
| EP | 0 409 760 A1 | 1/1991 |
| EP | 0 933 163 A1 | 8/1999 |
| EP | 0 947 287 A2 | 10/1999 |
| EP | 1 245 335 A2 | 10/2002 |
| JP | A-06-176875 | 6/1994 |
| JP | A-2000-079545 | 3/2000 |
| JP | A-2002-046046 | 2/2002 |
| JP | A-2002-283202 | 10/2002 |

OTHER PUBLICATIONS

Chinese Office Action issued in Chinese Patent Application No. 200810087028.8 dated Aug. 11, 2010 (with translation).
Jul. 18, 2012 Office Action issued in Japanese Patent Application No. 2007-091964 (with translation).

\* cited by examiner

*Primary Examiner* — Robert Rose
(74) *Attorney, Agent, or Firm* — Oliff & Berridge, PLC (57) ABSTRACT

A cup attaching apparatus for attaching a cup serving as a machining jig on a surface of a lens comprises: a white LED which is an illumination light source for illuminating the lens placed on a lens supporting member; a screen applied with an alignment mark, on which screen an image of the lens illuminated by illumination light from the white LED is projected; a movement device which moves the cup set in an arm toward the lens along a reference axis for cup attachment, the position of the reference axis being associated with the alignment mark; and a light intensity increasing and decreasing device which increases and decreases light intensity of the white LED in response to an operation signal from an operation member to be operated by an operator, the operation member being placed on a front of a housing of the apparatus.

6 Claims, 6 Drawing Sheets

CUP ATTACHING APPARATUS

BACKGROUND OF THE INVENTION

1. Field of the Invention

The present invention relates to a cup attaching apparatus for attaching a cup used for machining a peripheral edge of an eyeglass lens, to the lens to be machined (processed).

2. Description of Related Art

For machining a peripheral edge of an eyeglass lens, a cup attaching apparatus is used to attach a cup to the surface of a lens to be machined (a workpiece lens). This cup serves as a machining jig for holding the workpiece lens on a lens chuck shaft of a lens edge machining device. The cup attaching apparatus is also called a blocker. As this type of cup attaching apparatus, there is known an apparatus provided with a screen on which an image of the workpiece lens is projected by illumination light emitted from an illumination light source. By observing the lens image (an image of a mark applied on the lens, an image of a double focus lens, etc.) projected on the screen and an alignment mark formed on the screen, an operator adjusts the position of the lens to a desired relationship with a reference axis for cup attachment and then presses an arm in which the cup is previously set, thereby attaching the cup to the surface of the lens (e.g., see U.S. Pat. No. 7,150,672 (JP2002-283202A)).

In the above type of apparatus, heretofore, a halogen lamp or a xenon lamp has been used as an illumination light source. However, those lamps have a short life, requiring frequent replacement of lamps. In recent years, a high-luminance white LED has been in practical use and available at low cost. It is accordingly conceivable to use such a white LED having a long life as the illumination light source.

However, when the white LED was used as the illumination light source of the cup attaching apparatus, the following disadvantages were found. The white LED has emission characteristics that the intensity of a blue wavelength component is higher and the intensity of a red wavelength component is relatively slightly low than those of a halogen lamp. Accordingly, a colored lens such as sunglass lens having particularly a red wavelength component with a low transmittance causes a large decrease in amount of illumination light allowed to pass through the lens, resulting in a dark image projected on the screen and thus deteriorating visibility of the mark image on the lens. In the case of a transparent lens having a high transmittance, to the contrary, when the light intensity of the white LED is set to be higher to enhance the visibility with the colored lens, the illumination light of the high-luminance white LED is so strong that the image projected on the screen causes glare to an operator, leading to a burden on the eyes of the operator. Further, the white LED has a property of immediately increasing the light intensity up to a set value as soon as the LED is turned on. Particularly, in the case where the cup attaching apparatus is used in a dark place and also due to the high intensity of the blue wavelength component, the illumination light at turn-on tends to stimulate the eyes, which would be a large burden to the eyes.

BRIEF SUMMARY OF THE INVENTION

The present invention has an object to provide a cup attaching apparatus superior in durability, capable of providing high visibility in observation of a lens image in accordance with lens transmittance, and further reducing a burden to operator's eyes.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a cup attaching apparatus for attaching a cup serving as a machining jig on a surface of a lens, the apparatus comprising: a white LED which is an illumination light source for illuminating the lens placed on a lens supporting member; a screen applied with an alignment mark, on which screen an image of the lens illuminated by illumination light from the white LED is projected; a movement device which moves the cup set in an arm toward the lens along a reference axis for cup attachment, the position of the reference axis being associated with the alignment mark; and a light intensity increasing and decreasing device which increases and decreases light intensity of the white LED in response to an operation signal from an operation member to be operated by an operator, the operation member being placed on a front of a housing of the apparatus.

According to another aspect, the invention provides a cup attaching apparatus for attaching a cup serving as a machining jig on a surface of a lens, the apparatus comprising: a white LED which is an illumination light source for illuminating the lens placed on a lens supporting member; a screen applied with an alignment mark, on which screen an image of the lens illuminated by illumination light from the white LED is projected; a movement device which moves the cup set in an arm toward the lens along a reference axis for cup attachment, the position of the reference axis being associated with the alignment mark; a switching signal input device for inputting a turn-on/off switching signal to turn on/off the white LED; and a control device which is operated in response to the turn-on switching signal to slowly increase turn-on light intensity of the white LED up to light intensity set by a light intensity increasing and decreasing device within a time determined in consideration of miosis of a pupil of the operator.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1A:
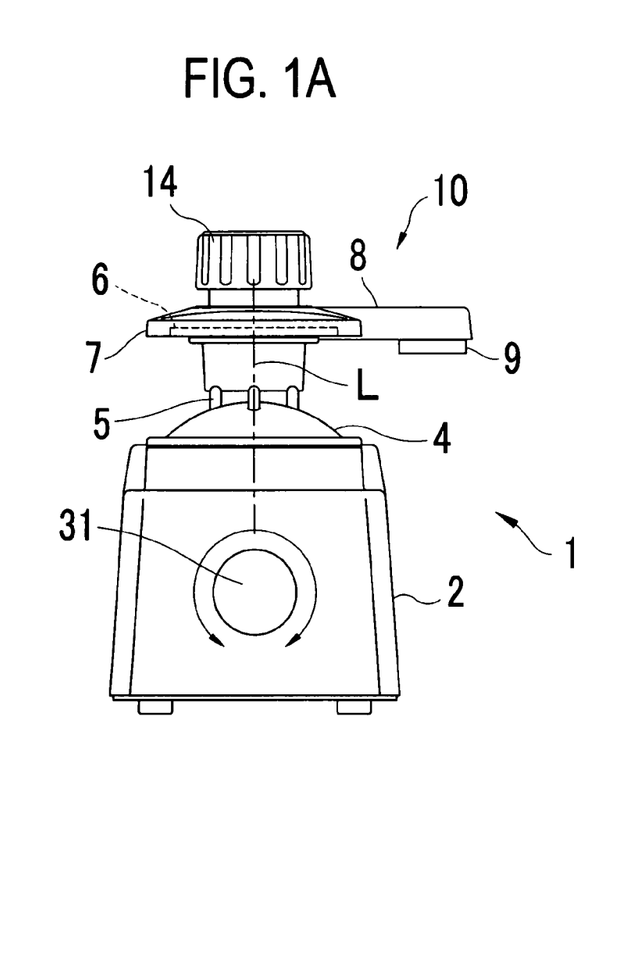
FIG. 1A is a front view of a cup attaching apparatus of a preferred embodiment.
Figure 1B:
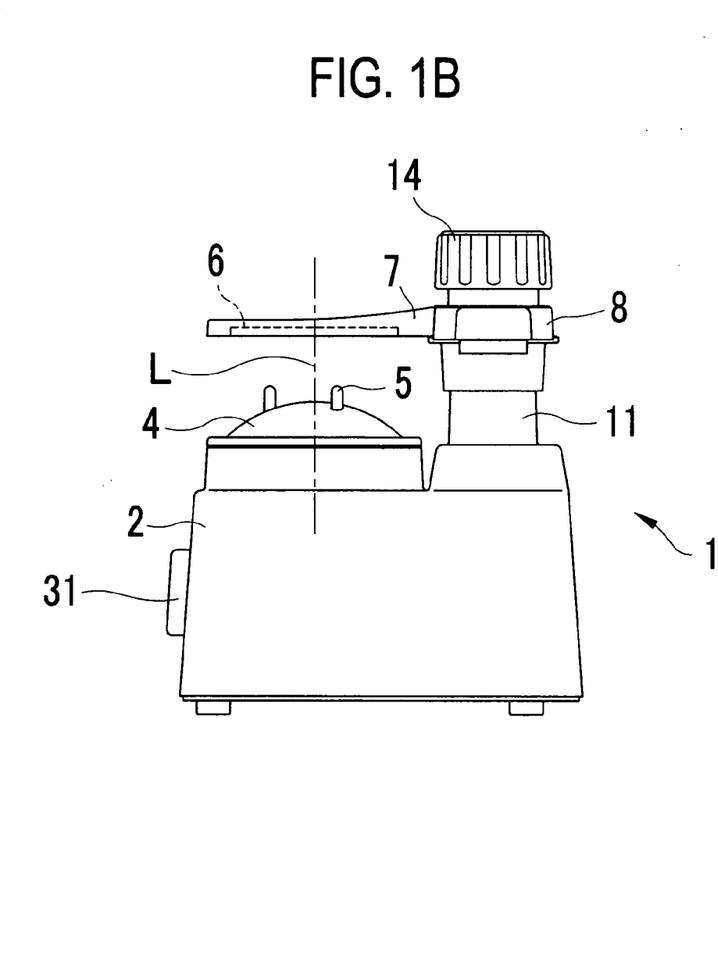
FIG. 1B is a side view of the cup attaching apparatus.
Figure 2:
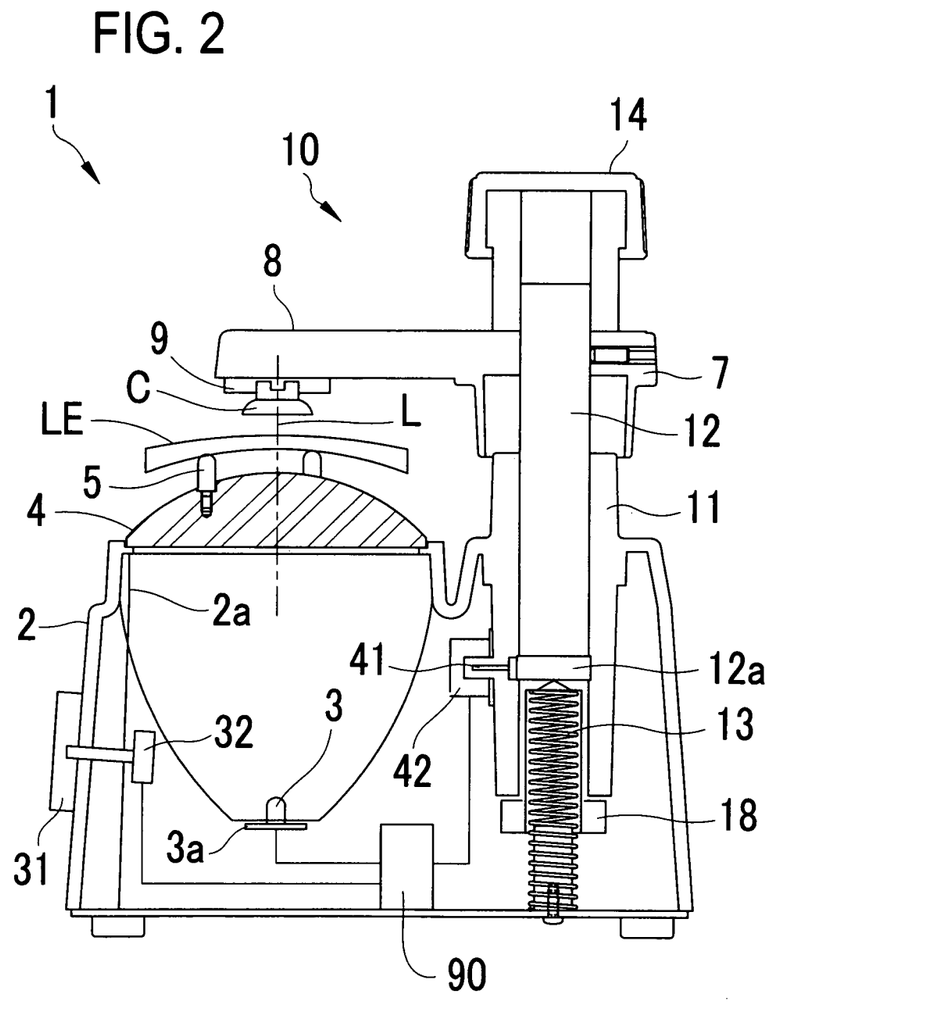
FIG. 2 is a schematic view showing the inside of the cup attaching apparatus.
Figure 3:
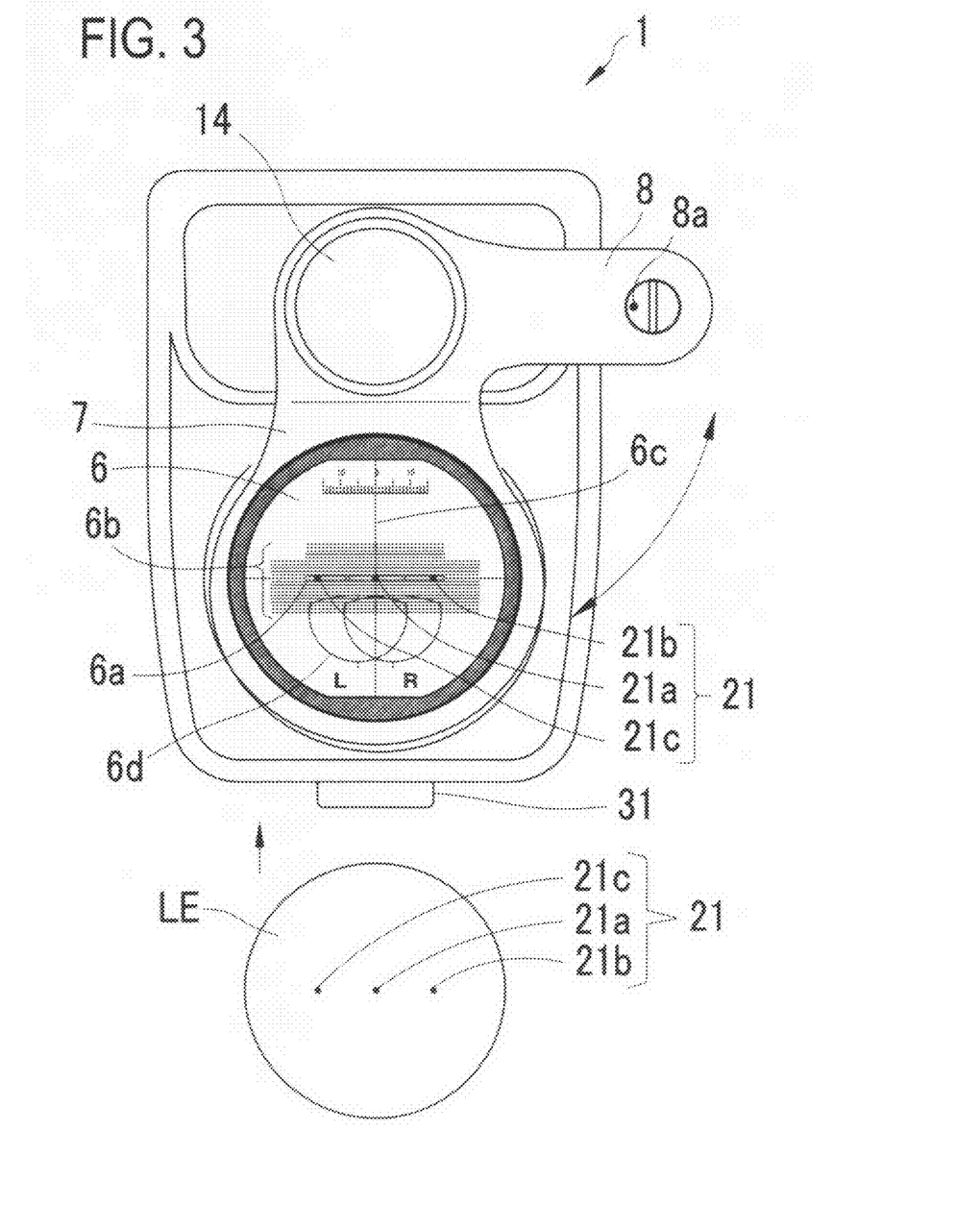
FIG. 3 is a plan view of the cup attaching apparatus.

A detailed description of a preferred embodiment of the present invention will now be given referring to the accompanying drawings. FIGS. 1A and 1B are external views of a cup attaching apparatus 1 of the embodiment; FIG. 1A is a front view and FIG. 1B is a side view. FIG. 2 is a side view showing the inside of the apparatus 1. FIG. 3 is a plan view of the apparatus 1.

In FIGS. 1A, 1B, and 2, L denotes a reference axis for centering. In a main casing 2, a white LED is provided as an illumination light source (hereinafter, simply referred to as a "light source") 3 placed on the reference axis L. A condensing lens 4 is located in an upper part of the main casing 2. This condensing lens 4 serves to collimate illumination light from the light source 3 into a parallel beam. On the upper surface of the condensing lens 4, three lens support pins (lens supporting members) 5 are arranged to center a lens LE (hereinafter, also referred to as a "workpiece lens LE") on the reference axis L. The main casing 2 is formed with a tapered inner wall 2a providing a cone-shaped hollow between the light source 3 and the condensing lens 4. To prevent light emitted from the light 3 from becoming reflected by the inner wall 2a, thereby reducing noise to the illumination light collimated by the condensing lens 4, the inner wall 2a is applied with a coating or the like for reducing light reflection.

In the present embodiment, an LED (light emitting diode) which emits white light is used as the light source 3. Around the light source 3, a substrate 3a made of a high heat-conductive material is attached to promote heat release.

A control section 90 is placed in the main casing 2 and serves to a light emission control device for executing controls related to light emission such as turn-on/off control of the light source 3, light intensity adjustment with a rotary knob 31 mentioned later, and timer-off control of the light source 3.

On the front of the main casing 2, the rotary knob 31 (an operation member) which is to be manipulated by an operator to control the light intensity of illumination light. The rotary knob 31 is fixed to a rotary shaft of a rotary variable resistor 32 mounted in the main casing 2. By rotation of the rotary knob 31, a resistance value of the resistor 32 is changed, and the resistance value (an operation signal) is transmitted to the control section 90 connected to the resistor 32. In response to the resistance value of the resistor 32, the control section 90 changes a value of electric current to be supplied to the light source 3 to control emission light intensity of the light source 3. The rotary knob 31 can be rotated at an angle in a range of about 300 degrees as shown by an arrow in FIG. 1A but the knob 31 is restricted from further rotation beyond the angle range. When the rotary knob 31 is rotated to a leftmost position, the resistance value of the resistor 32 is reduced to a minimum. Accordingly, the control section 90 controls to allow a minimum electric current to flow in the light source 3, thereby decreasing the light intensity of the light source 3. On the other hand, when the rotary knob 31 is rotated to a rightmost position, the resistance value of the resistor 32 is increased to maximum. The control section 90 then controls to increase the electric current allowed to flow in the light source 3, thereby increasing the light intensity of the light source 3. In the above way, the rotary knob 31, the variable resistor 32, and the control section 90 constitute a light intensity increasing and decreasing device for increasing and decreasing (controlling) the light intensity of the white LED.

The main casing 2 is integrally formed with a cylindrical part 11 on the rear side. In this cylinder part 11, a shaft 12 constituting a cup attaching part 10 is fitted to be movable up and down and rotatable around its axis. This axis of the shaft 12 is parallel to the reference axis L. The shaft 12 is always urged upward, opposite to a cup attaching direction, by a spring 13 placed between a lower part of the shaft 12 and a bottom of the main casing 2. The spring 13 has an urging force for lifting the shaft as shown in FIG. 2 against a load of the cup attaching part 10. A stopper member 18 is attached to the bottom of the shaft 12 to prevent the shaft 12 from coming off upward due to the urging force of the spring 13.

To the upper part of the shaft 12, an arm 7 holding a screen plate 6 and an arm 8 holding a cup C are secured with a screw. Under a distal end of the arm 8, a mounting part 9 is provided, in which a base portion of the cup C can be fitted removably. The screen plate 6 is formed as shown in FIG. 3 with a mark 6a for alignment of point marks 21 (three point marks 21a, 21b, 21c) formed on the workpiece lens LE, horizontal-line marks 6b arranged at regular intervals, a vertical-line mark 6c for alignment with the reference axis L in a right and left direction, marks 6d for alignment of a double focus lens, and others.

On a part of the arm 8 positioned on the axis of the shaft 12, a rotary knob 14 having a face to be pressed by an operator is attached. When the rotary knob 14 is rotated, the screen plate 6 and the arm 8 are rotated integrally around the axis of the shaft 12 parallel to the reference axis L between a position in which the center of the screen plate 6 is located on the reference axis L (a state shown in FIGS. 1A and 1B) and a position in which the center of the cup C fitted in the mounting part 9 at the distal end of the arm 8 is located on the reference axis L (a state shown in FIG. 2). The shaft 12 serves as a holding device which holds the screen plate 6 and the arm 8 to allow integral rotation thereof and also holds screen plate 6 to allow movement thereof between a position on the reference axis L and a position off the reference axis L. The shaft 12, the spring 13, the rotary knob 14, and others constitute a movement device for moving the cup C set at the distal end of the arm 8 toward the workpiece lens LE along the reference axis L for cup attachment.

The arms 7 and 8 are integrally formed in L shape, whereby a positional relationship between the center of the screen plate 6 and the center of the cup C is kept at an angle of 90 degrees. Further, the integrally formed arms 7 and 8 can facilitate control of the apparatus 1 and also make an entirely compact apparatus.

A configuration providing a photo-interrupter is arranged below the center of the shaft 12 in its axial direction. Accordingly, the light source 3 is turned on and off in association with the aforementioned rotation of the shaft 12 (the rotary knob 14). Specifically, a guide 12a which is rotated in association with the rotation of the shaft 12 is placed below the center of the shaft 12. The guide 12a includes a light shielding plate 41. The cylindrical part 11 is formed with a slit at a position (height) corresponding to the light shielding plate 41. A photosensor 42 is installed across the slit. The guide 12a is held at the fixed height even when the shaft 12 is moved up and down by pressure. The photosensor 42 is of a laterally-facing U-shaped section with a recess and serves as the photo-interrupter arranged such that an output signal of the photosensor 42 changes in response to movement of the light shielding plate 41 into or out of the recess. The light shielding plate 41 is rotated at an angle of 90 degrees as the shaft 12 is rotated so that the light shielding plate 41 comes in the photosensor 42 when the center of the screen plate 6 is placed on the reference axis L. When the light shielding plate 41 is moved in the photosensor 42, a signal from the photosensor 42 is input to the control section 90 as a switching signal to turn on the light source 3. Upon receipt of this switch signal, the control section 90 turns on the light source 3. On the other hand, when the center of the screen plate 6 is moved off the reference axis L, the light shielding plate 41 is simultaneously moved out of the photosensor 42. At that time, a signal from the photosensor 42 is input to the control section 90 as a switching signal to turn off the light source 3. Upon receipt of this switching signal, the control section 90 turns off the light source 3. The photosensor 42 serves as a switching signal input device for generating a switching signal to turn on/off the light source 3. In response to the turn-on switching signal, the control section 90 controls to slowly increase the light intensity of the white LED used as the light source 3 within 1 to 3 seconds until the light intensity reaches an approximate preset value of light intensity (the details will be mentioned later).

The control section 90 further includes a timer function for measuring the time elapsed from the time when the light source 3 is turned on. Accordingly, after a lapse of a predetermined time (herein, three minutes) from the start of turn-on, the control section 90 stops the supply of electric current to the light source 3 to turn off it (to automatically turn off the light source 3) even where the light shielding plate 41 is in the photosensor 42.

As above, the light source 3 is turned on for observation while the screen plate 6 is placed on the reference axis L and turned off when the screen plate 6 for cup attachment is moved off the reference axis L. Thus, a conventional ON/OFF operation with a power switch is not required. Further, the high-luminance illumination light will not interfere with a cup attachment work and hence the work can be performed efficiently. By the auto OFF function of the light source 3, it is possible to prevent the illumination light from being left on. This leads to energy saving.

Figure 4:
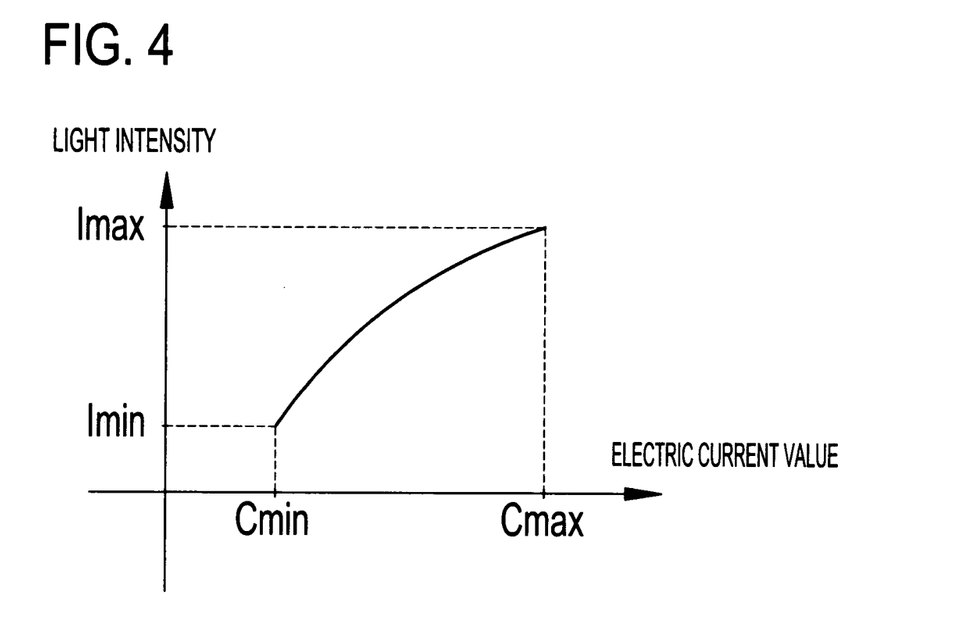
FIG. 4 is a graph showing a relationship between electric current supplied to an illumination light source and light intensity.

Control of the emission light intensity of the light source 3 will be described below referring to FIGS. 4 and 5. As mentioned above, the light intensity of the light source 3 can be controlled by rotation of the rotary knob 31. FIG. 4 is a graph showing a relationship between the value of electric current flowing in the light source 3 and the light intensity of the light source 3. In the graph, a lateral axis indicates an electric current value corresponding to the rotation of the rotary knob 31 and a vertical axis indicates the light intensity of illumination light. In the present embodiment, this light intensity corresponds to the light intensity of light that is emitted from the light source 3 and passes through the condensing lens 4 and the screen plate 6, and is measured at a position slightly above the screen plate 6. The illumination light intensity corresponding to a minimum current value Cmin is assumed to be a minimum light intensity Imin and the illumination light intensity corresponding to a maximum current value Cmax is assumed to be a maximum light intensity Imax. As shown in the graph, the electric current value and the light intensity of illumination light do not have a linear relationship, but do have a nonlinear curved relationship (plotted as a nonlinear curve). Such nonlinear change in light intensity is achieved by the control section 90.

The maximum light intensity and the minimum light intensity are set in consideration of both the emission characteristics of the white LED mentioned later and the visibility of the point marks after the light of the white LED has passed through the point marks on the workpiece lens LE and the screen plate 6.

Figure 5:
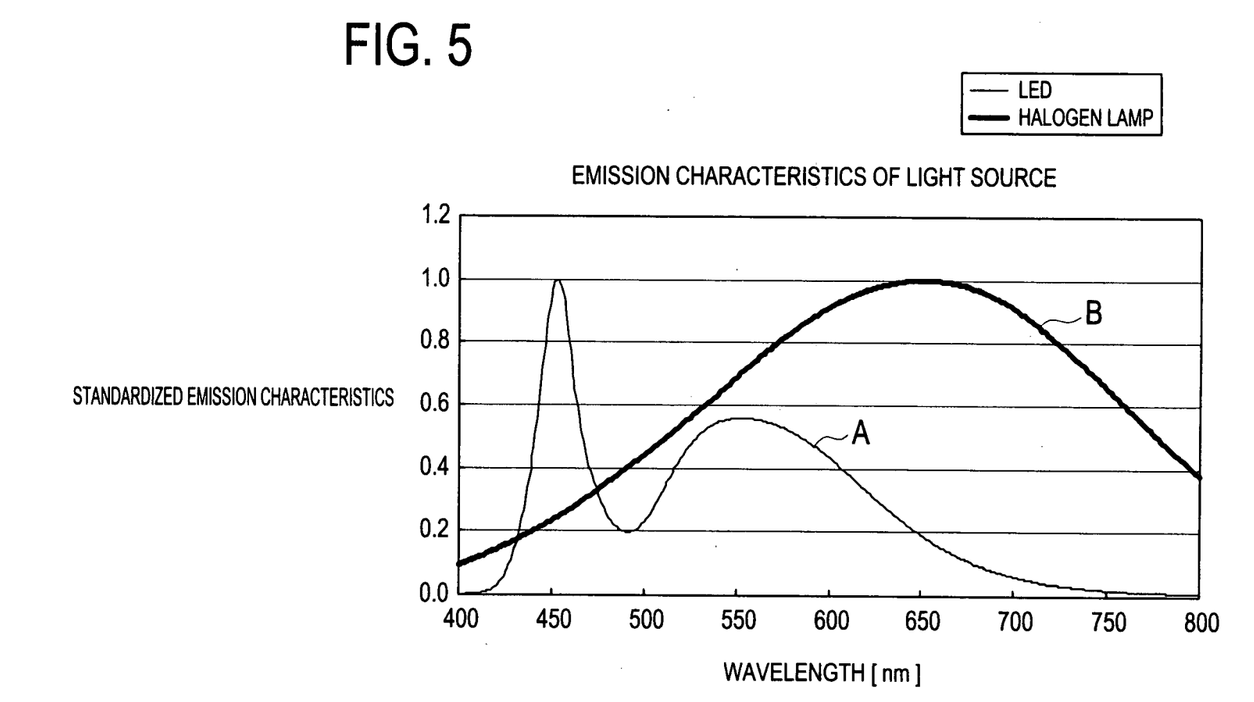
FIG. 5 is a graph showing a relationship between emission characteristics of a white LED and emission characteristics of a halogen lamp.

FIG. 5 is a graph showing emission characteristics (wavelength distribution) of an LED used as the light source 3 in the present embodiment and emission characteristics of a halogen lamp used as an illumination light source in a prior art. In FIG. 5, a lateral axis indicates wavelength $\lambda$ (nm) and a vertical axis indicate standardized emission characteristics assuming a peak value in each light source to be "1". A plotted line A indicates the emission characteristics of the white LED and a plotted line B indicates the emission characteristics of the halogen lamp. The line B shows that an emission component in a red wavelength region (a visible wavelength range longer than a wavelength of 600 nm) exhibiting a red color is stronger than an emission component in a green wavelength region (around a wavelength of 520 nm to 570 nm) exhibiting a green color. On the other hand, contrary to the halogen lamp, the plotted line A indicating the emission characteristics of the white LED shows that an emission component in a green wavelength region (around a wavelength of 520 nm to 570 nm) exhibiting a green color with a peak at about a wavelength of 550 nm is stronger than an emission component in a red wavelength region exhibiting a red color. The emission characteristics of the halogen lamp and the white LED are somewhat different among manufacturers but the characteristic tendency is basically presented as shown in FIG. 5.

The white LED has unbalanced emission characteristics. Accordingly, in the case of the workpiece lens LE is colored or the like, the visibility of the point marks may be decreased according to the wavelength transmittance characteristics of the workpiece lens LE. Further, the white LED has the emission characteristics biased toward a blue region, which is likely to cause an operator to feel glare when views the light through the screen plate 6. In particular, if the workpiece lens LE is transparent (a transmittance in a visible region is about 100%), the point marks on the workpiece lens LE are hard to see. The inherent wavelength emission characteristics of the white LED cannot be changed. In order to reduce those problems, when the light intensity of the light source 3 is controlled to increase/decrease, the maximum light intensity (maximum luminance) and the minimum light intensity (minimum luminance) of the white LED obtained in observation through the screen plate 6 are also set.

The range of increase and decrease in light intensity of the light source 3 is preferably determined to allow the luminance of light having passed through the screen plate 6 to increase and decrease at least in a range of 320 to 550 cd/m$^2$.

The maximum light intensity and the minimum light intensity were inspected by the following experiments and luminance values were determined at that time. The luminance values were measured in such a way that the center of the screen plate 6 was placed on the reference axis L and then the light source 3 was turned on, various sample lenses were individually put on the lens support pins 5, and the luminance of each lens was measured in a position above the center of screen plate 6 (on the reference axis L) and at a distance of about 1 m apart from the screen plate 6. This measurement was executed in an almost dark room. In addition to the sample lenses having different transmittance, transparent and colorless sample lenses having different refractive powers were inspected. This is to take it into consideration that a lens having a refractive power tends to diffuse the light from the light source 3, which may cause an operator to feel that the light intensity of light having passed through the screen plate 6 is different from the light intensity passing through the lens having different refractive power.

The minimum light intensity was determined in the following steps. Transparent and colorless sample lenses with a transmittance of about 100% and +20 D were applied with point marks. Each lens was put on the pins 5 and the light source 3 was turned on. While looking at the point marks of the sample lens through the screen plate 6, an experimenter controlled the light intensity of illumination light so that the point marks be viewed to the extent that the experimenter does not feel glare. The luminance value at that time was on the order of 400 to 500 cd/m$^2$. The luminance measured after the sample lens was demounted from the pins 5 was 250 to 320 cd/m² on the screen plate 6. The light intensity at that time is assumed to be the minimum light intensity.

The maximum light intensity was determined as follows. Five kinds of sample sunglass lenses with a lowered transmittance were prepared and applied with point marks. The colors of the sample lenses were yellow (SNYL50F), dark green (SNGN85F), charcoal (SNGY85F), blue (SNBL70F), and dark brown (SNBR85F). Those sample lenses were individually put on the pins 5 and further a transparent and colorless sample lens with −18 D was superposed thereon, and then the light source 3 was turned on. The experimenter controlled the light intensity of illumination light to the extent that the point marks applied on each sample lens could be viewed through the screen plate 6. The luminance at that time was about 35 to 70 cd/m². The luminance on the screen plate 6 after the sample lens was demounted from the pins 5 was about 550 to 1100 cd/m². The light intensity at that time is assumed to be the maximum light intensity.

As above, when the range of the light intensity of illumination light through the screen plate 6 is at least the order of 320 to 550 cd/m², preferably, the order of 250 to 1100 cd/m², the light intensity of illumination light, providing ease of work for an operator.

Those maximum light intensity and minimum light intensity are reflected in the apparatus by adjusting a circuit element such as a resistor and others in the control section 90. The light intensity is set by the control section 90 as above. The range of light intensity of illumination light may be set by not only the control section 90 but also a configuration of making a value of electric current flowing in the light source 3 correspond to a resistance value (rotation angle) of the variable resistor 32. In this case, a restriction member may be added to restrict the rotatable range of the resistor 32.

By the configuration allowing the control of the illumination light intensity on the screen plate 6 in the aforementioned range, the point marks of the workpiece lens LE can be viewed by the operator irrespective of the transmittance of the workpiece lens LE and transmission characteristics depending on wavelengths. In the present embodiment, the rotary variable resistor 32 is used to consecutively change the resistance value, thereby serially changing the light intensity of illumination light. Another configuration of stepwise controlling the light intensity of illumination light may also be adopted.

Figure 6:
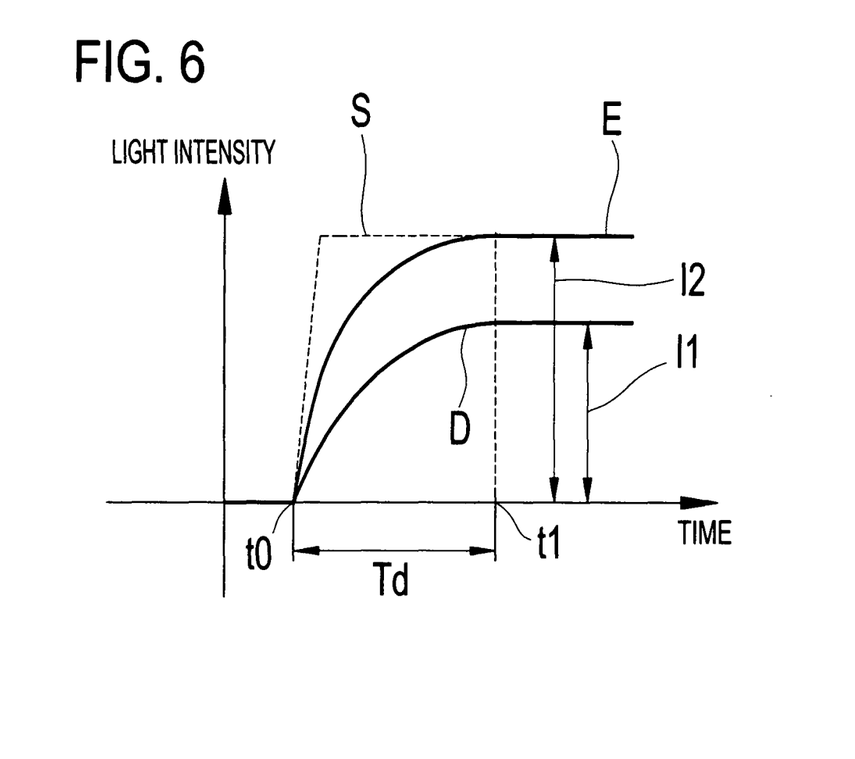
FIG. 6 is a graph showing variation in light intensity of the illumination light source.

The following explanation is given to the control to delay the turn-on of the light source 3 (i.e., the control to slowly increase the light intensity upon turn-on). FIG. 6 is a timing chart showing changes in light intensity. A lateral axis indicates time and a vertical axis indicates light intensity. The time at which a trigger signal to turn on the light source 3 is transmitted from the photosensor 42 to the control section 90 is assumed to be t0. A plotted line D shows the case where the light intensity of illumination light is I1 and a plotted line E shows the case where the light intensity of illumination light is I2. Those light intensities are assumed to have been set with the aforementioned rotary knob 31, variable resistor 32, and so on. The light intensity of illumination light is previously set based on the position of the rotary knob 31. A plotted dotted-line S schematically shows response of the light intensity when electric current is supplied to the white LED at time t0.

According to the line S, the light intensity of the LED immediately changes in response to a turn-on trigger signal at time t0. The light intensity of the LED reaches the preset light intensity with no or little delay from the time t0. Such change in light intensity may be perceived as a strong stimulus (burden) by the operator. As mentioned above, the light emitted from the white LED is perceived as a strong stimulus by human being, so that rapid turn-on of the LED leads to a burden on the operator.

Different from the line S, the lines D and E show the configurations of controlling turn-on of the light source 3 so as not to place a burden on the operator even in the case of using the white LED. Attention is paid to the line D, which shows that the light intensity of illumination light begins to increase at the time t0 and reaches the set light intensity I1 at the time t1. This results from the following configuration. The control section 90 includes a RC circuit constituted of a condenser and a resistor, and the electric current to be supplied to the light source 3 from the time t0 by the control section 90 serving as a turn-on control device in response to the trigger signal charges the condenser, which causes the delay of increase in electric current of the light source 3. In the present embodiment, the delay time Td from t0 to t1 is set to about 1 second. The delay time may be adjusted by setting of the condenser, the resistor, and others in the control section 90 (the condenser and others may be placed outside the control section 90). A shortest time from t0 to t1 is set in consideration of a miosis time of a pupil of a human eye. A longest time is set in consideration of workability. In the case where the working environment is dark, if the shortest time from t0 to t1 is less than 1 second, the human pupil that has dilated could not constrict (miosis) promptly. Thus, the human eye tends to feel glare. If there is at least 1 second to gradually increase the light intensity of the light source 3, the miosis of the human eye responds to the increase in light intensity. If it takes more than 3 seconds to reach the set light intensity (at t1), such time is felt to be lengthy for the operator who observes the screen plate 6. Consequently, the time to t1 is preferably set to 3 seconds or less.

As to the case of the line E, similarly, the time needed for the light intensity of the light source 3 to reach the preset light intensity I2 takes the delay time Td. This is because a time constant of the condenser and the resistor is fixed irrespective of light intensities preset by the variable resistor 32 and others.

The full turn-on of the light source 3 is delayed (by slowly increasing the light intensity) as above, light stimulus to the operator is reduced. Further, even when the light source 3 is a device having emission characteristics that gives a strong stimulus (burden) to the operator, such as the white LED, the stimulus caused by turn-on can be reduced by execution of the above turn-on control.

In the above embodiment, the control section 90 is arranged to control turn-on of the light source 3 to slowly bring the light intensity of the light source 3 to the preset light intensity value within 1 to 3 second(s). However, the present invention is not limited to such configuration. The turn-on has only to be controlled not to place a burden on the operator. For instance, the control section 90 may be arranged to turn on the light source 3 by slowly changing the light intensity to an approximate set value of the preset light intensity within 1 to 3 second(s), and then changing the light intensity from the approximate set value to the exact set value in additional several seconds. Even this configuration will not make the operator feel that the turn-on time of the light source 3 takes too long.

In the embodiment explained as above, the delay in turn-on is achieved by a combination of the condenser, resistor, and others. As an alternative, however, the control section 90 may be provided with a timer to stepwise increase the light intensity.

The operations of the apparatus having the above mentioned structure will be described below. Hereinafter, the case of centering the optical center of a workpiece lens is explained.

The operator first aligns the center of the screen plate 6 with the reference axis L and mounts the cup C to the mounting part 9 of the cup attaching part 10. When the center of the screen plate 6 is positioned on the reference axis L, the switching signal for turn-on is transmitted from the photosensor 42 to the control section 90, thereby turning on the light source 3. At that time, the light intensity is slowly increased up to the set light intensity as mentioned above even where the light source 3 is a white LED. Accordingly, the operator's eyes are not strongly stimulated and can observe the screen plate 6. For mounting the cup C, the base portion of the cup C is fitted in the mounting part 9 in accordance with an alignment mark 8a applied on an upper surface of the distal end of the arm 8 so that the cup C is oriented in a predetermined direction. The workpiece lens LE that has been applied in advance with a point mark representing the optical center by a lensmeter is put on the support pins 5. The workpiece lens LE is then illuminated by illumination light from the light source 3 and its image is projected on the screen plate 6. Successively, the operator turns the rotary knob 31 to control the light intensity of the illumination light (projection light) in accordance with the optical characteristics of the workpiece lens LE so that the point mark is visible easily. The point mark images 21 of the workpiece lens LE are aligned with the point-mark alignment mark 6a on the screen plate 6. Specifically, this alignment is achieved by adjusting the center point mark image 21a of the workpiece lens LE to the center of the alignment mark 6a and positioning the other two right and left point mark images 21b and 21c onto a horizontal line of the horizontally long alignment mark 6a.

Thereafter, the rotary knob 14 is rotated to turn the arm 8 by an angle of 90 degrees to bring the center of the cup C in alignment with the reference axis L, moving the screen plate 6 off the reference axis L. At that time, the turn-off switching signal is transmitted from the photosensor 42 to the control section 90. Thus, the light source 3 is turned off without requiring an operator's operation for turning off the light source. When the center of the cup C set at the distal end of the arm 8 is aligned with the reference axis L1 and thus en the rotary knob 14 is pressed down, the spring 13 is compressed and deformed first, and accordingly a movable section including the rotary knob 14, the arms 7 and 8, and the shaft 12 is entirely moved downward. At that time, the guide 12a and the light shielding plate 41 are held against vertical movement. After the cup C is brought into contact with the upper surface of the workpiece lens LE, the rotary knob 14 is continuously pressed down to fixedly hold the cup C on the lens LE. When the rotary knob 14 is further pressed down, the spring 13 begins to be further compressed and deformed and absorbs operator's pressing force on the rotary knob 14. At this time, the operator feels a resistance which indicates the completion of fixing the cup C, and then releases the rotary knob 14, which is returned to an original position thereof. Thus, the cup attaching work is terminated. It is to be noted that the cup C may include various types such as an adsorbing type and another type with double-sided adhesive tape interposed between the cup C and the lens LE.

In the above embodiments, the light source 3 is turned on by the control section 90 when detects the rotary shaft 12. As another configuration, a switch may be provided on the main casing 2 to be connected to the control section 90, and the light source 3 is turned on by operation of this switch by an operator.

The control of turn-on of the light source 3 may be achieved in such a way that the switch, the RC circuit, and the light source 3 are connected, without providing the control section 90. This configuration can simplify the internal structure of the apparatus 1.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A cup attaching apparatus for attaching a cup serving as a machining jig on a surface of a lens, the apparatus comprising:
    a white LED which is an illumination light source for illuminating a lens placed on a lens supporting member;
    a screen applied with an alignment mark, on which screen an image of the lens illuminated by illumination light from the white LED is projected;
    a movement device which moves the cup set in an arm toward the lens along a reference axis for cup attachment, the position of the reference axis being associated with the alignment mark;
    a light intensity increasing and decreasing device which increases and decreases light intensity of the white LED in response to an operation signal from an operation member to be operated by an operator, the operation member being placed on a front of a housing of the apparatus;
    a switching signal input device for inputting a turn-on/off switching signal to turn on/off the white LED; and
    a control device which is operated in response to the turn-on switching signal to slowly increase turn-on light intensity of the white LED up to light intensity set by the light intensity increasing and decreasing device within a time determined in consideration of miosis of a pupil of the operator.

2. The cup attaching apparatus according to claim 1, wherein the time determined in consideration of miosis of the pupil is 1 to 3 seconds.

3. A cup attaching apparatus for attaching a cup serving as a machining jig on a surface of a lens, the apparatus comprising:
    a white LED which is an illumination light source for illuminating the lens placed on a lens supporting member;
    a screen applied with an alignment mark, on which screen an image of the lens illuminated by illumination light from the white LED is projected;
    a movement device which moves the cup set in an arm toward the lens along a reference axis for cup attachment, the position of the reference axis being associated with the alignment mark;
    a switching signal input device for inputting a turn-on/off switching signal to turn on/off the white LED; and
    a control device which is operated in response to the turn-on switching signal to slowly increase turn-on light intensity of the white LED up to light intensity set by a light intensity increasing and decreasing device within a time determined in consideration of miosis of a pupil of the operator.

4. The cup attaching apparatus according to claim 3, wherein the time determined in consideration of miosis of the pupil is 1 to 3 seconds.

5. The cup attaching apparatus according to claim 3 further comprising:
- a holding device which holds the screen to be movable off the reference axis;
- a detector which detects that the screen is located on the reference axis; and
- a switching signal output device which outputs the turn-on switching signal when the detector detects that the screen is located on the reference axis.

6. A cup attaching apparatus for attaching a cup serving as a machining jig on a surface of a lens, the apparatus comprising:
- a lens supporting member on which the lens is placed;
- a white LED which is an illumination light source for illuminating the lens placed on the lens supporting member, the white LED having emission characteristics that provides weak emission in a red wavelength region having a visible wavelength longer than a wavelength of 600 nm but strong emission in a green wavelength region having a wavelength of 520 nm to 570 nm as compared with a halogen lamp;
- a screen applied with an alignment mark, on which screen an image of the lens illuminated by illumination light from the white LED is projected;
- a movement device which moves the cup set in an arm toward the lens along a reference axis for cup attachment, the position of the reference axis being associated with the alignment mark;
- a light intensity increasing and decreasing device including an operation member to be operated by an operator during a cup attaching operation and being configured to at least one of increase and decrease light intensity of the white LED in response to an operation signal from the operation member, the light intensity increasing and decreasing device being used by an operator to adjust a light intensity of the white LED according to a color of the lens to be placed on the lens supporting member;
- a holding device which holds the screen to be movable off the reference axis;
- a detector which detects that a predetermined position of the screen is located on the reference axis; and
- a switching signal output device which outputs a turn-on/turn-off switching signal to turn on/off the white LED, the switching signal output device being arranged to output the turn-on signal when the detector detects that the predetermined position of the screen is located on the reference axis and to output the turn-off signal when the detector detects that the predetermined position of the screen is located off the reference axis.

* * * * *